Nov. 2, 1948.    F. R. SCHULZ    2,453,101
MINIATURE PERMANENT MAGNET MOTOR
Filed Sept. 20, 1947    4 Sheets-Sheet 1
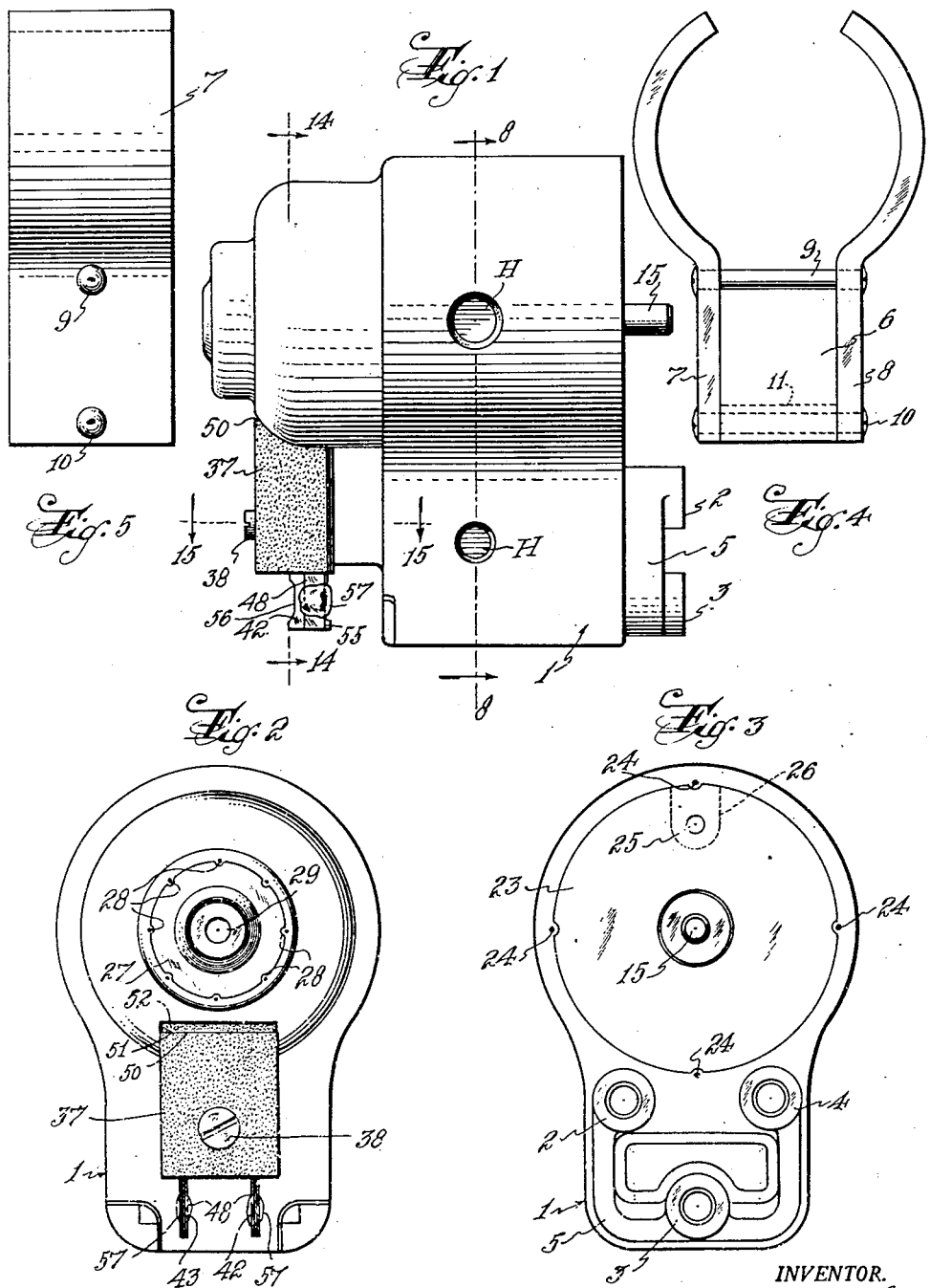
INVENTOR.
Fred R. Schulz
BY Harry R. Rook,
ATTORNEY.

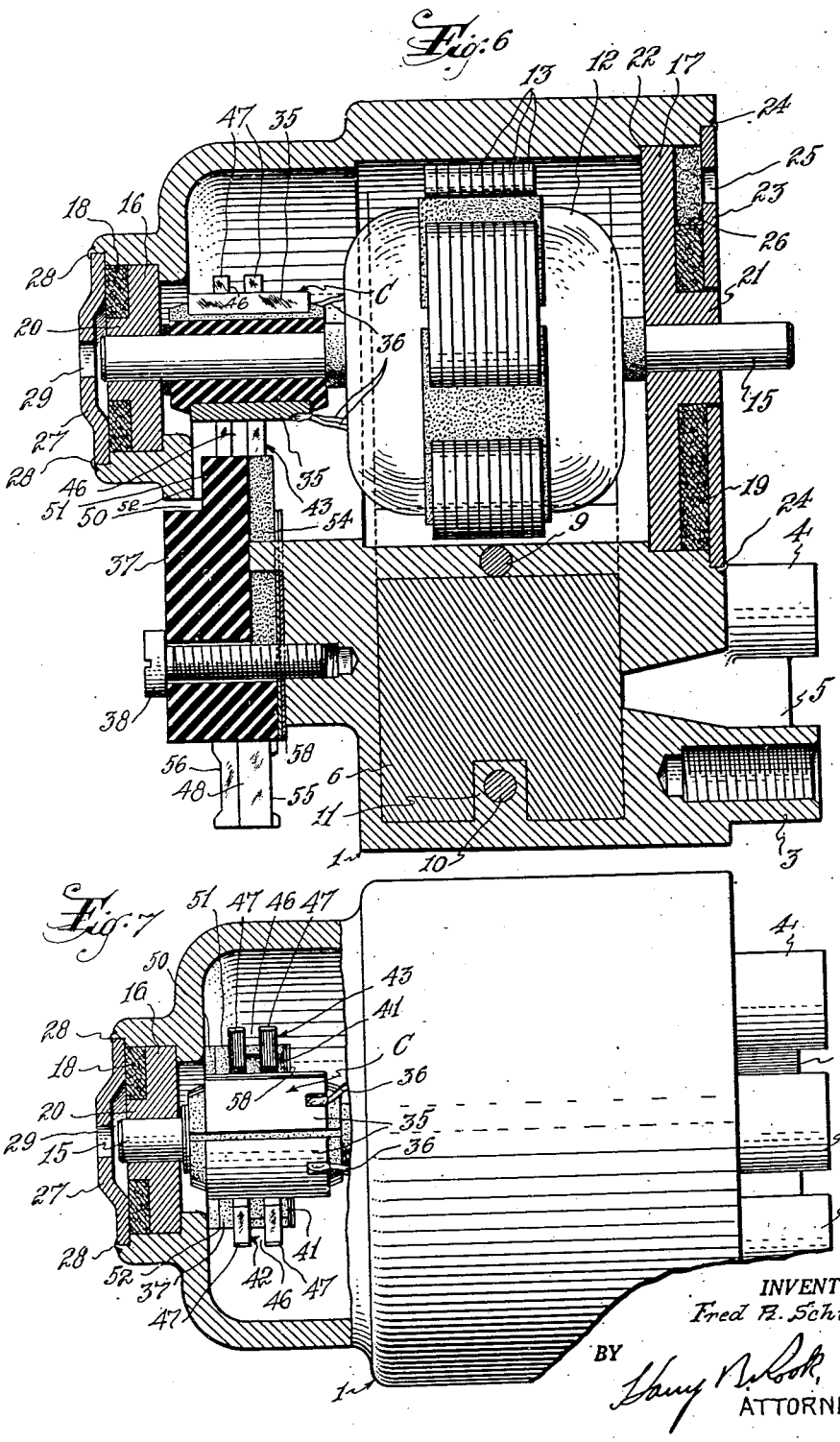

Nov. 2, 1948.    F. R. SCHULZ    2,453,101
MINIATURE PERMANENT MAGNET MOTOR
Filed Sept. 20, 1947    4 Sheets-Sheet 3
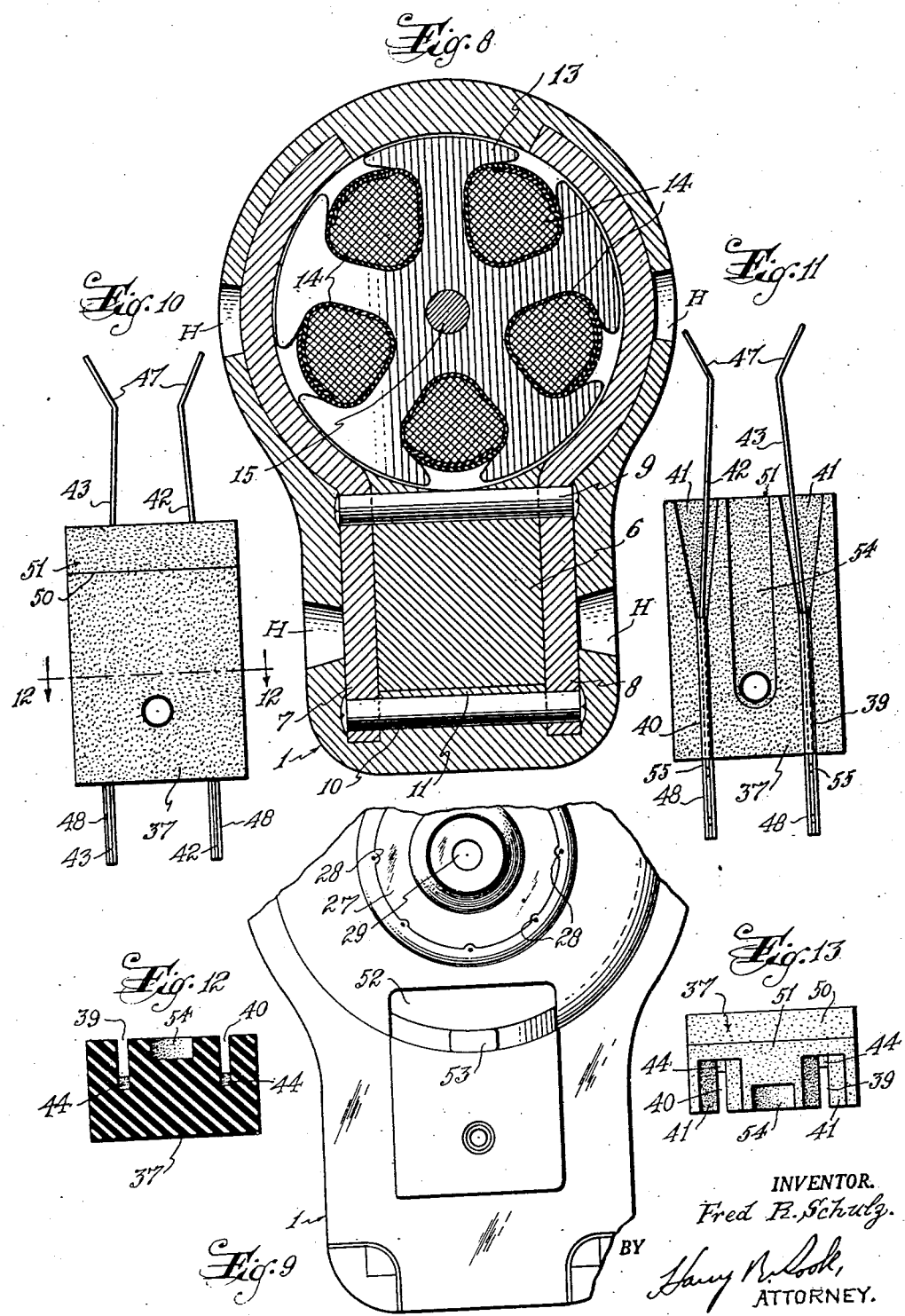

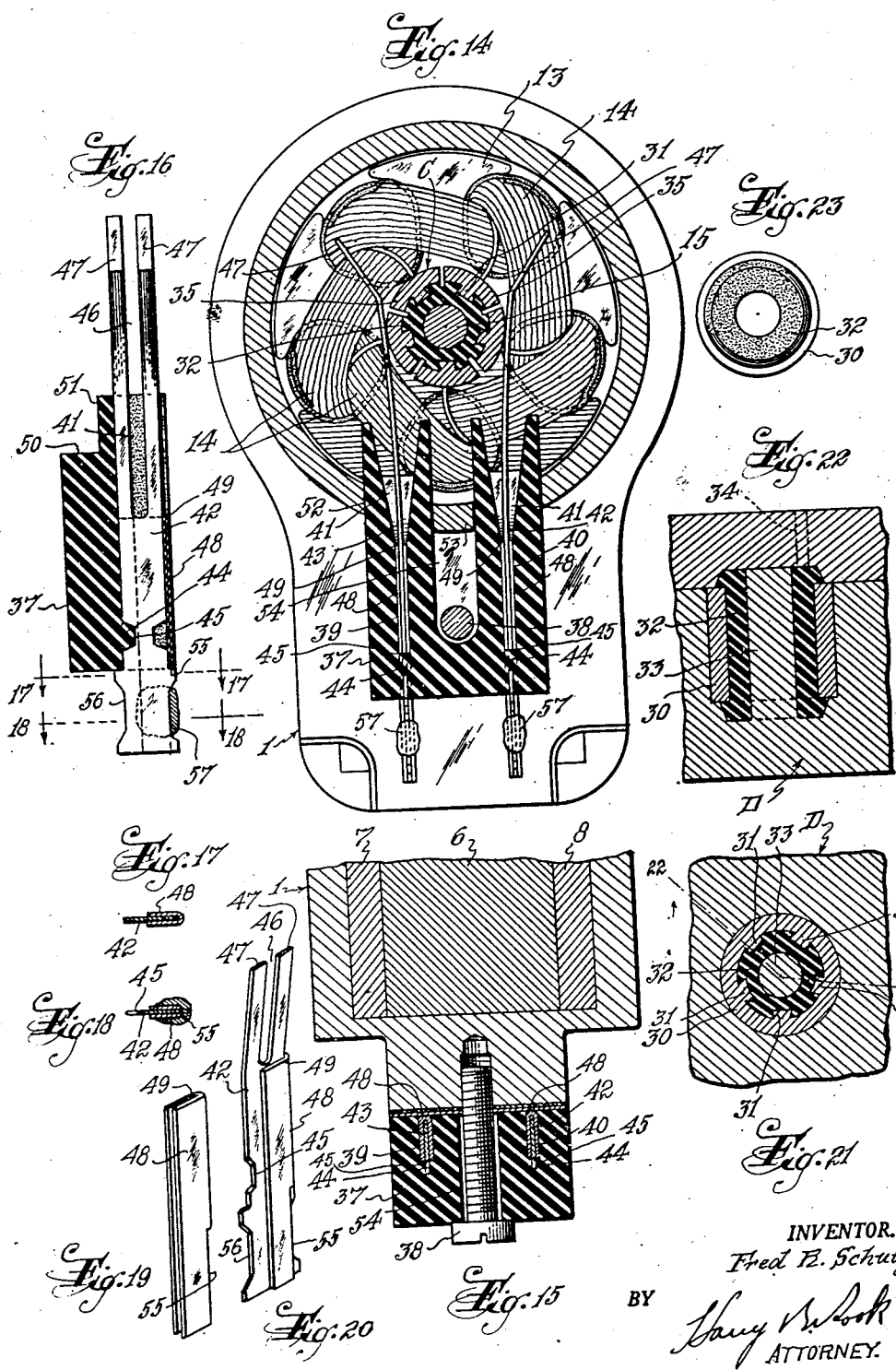

Patented Nov. 2, 1948

2,453,101

UNITED STATES PATENT OFFICE 2,453,101

MINIATURE PERMANENT MAGNET MOTOR

Fred R. Schulz, Scotch Plains, N. J., assignor to Essell Corporation, Newark, N. J., a corporation of New Jersey; Bernard Verney, trustee in bankruptcy of said Essell Corporation Application September 20, 1947, Serial No. 775,339

10 Claims. (Cl. 172—36)

This invention relates to the construction of a miniature direct-current electric motor utilizing a permanent magnet with suitable pole shoes for furnishing the magnetic flux to excite the armature of the motor.

The primary object of the invention is to provide a miniature motor for small timing devices and self-winding clocks where a minimum input of power to the motor is of primary importance.

To give a general idea of the size of the motor which I have constructed for the purpose, it may be said that the structure shown in the various views of the drawings has an overall length of 1½", a width of 1 1/32", and a height of 1½" and having a weight of approximately 3¼ ounces. From this it will be seen that the drawings, to illustrate the construction, are on a much enlarged scale in order to bring out clearly the details.

In the drawings,

Fig. 1 is a side elevational view of the complete motor;

Fig. 2 is a view of Fig. 1 looking from left to right;

Fig. 3 is a view of Fig. 1 looking from right to left;

Fig. 4 is a view of the magnet with its pole pieces;

Fig. 5 is a side view of Fig. 4;

Fig. 6 is a longitudinal vertical section of the structure of Fig. 1 but on a further enlarged scale;

Fig. 7 is a view looking down from the top of Fig. 1 on the same scale of Fig. 6 but with the framework of the motor broken away over the commutator end;

Fig. 8 is a section on the line 8—8 of Fig. 1 but on a scale similar to Fig. 6;

Fig. 9 is an end view of the device similar to Fig. 2 but with the brush holder removed, the scale being on the same basis as Fig. 8;

Fig. 10 is an enlarged view of the brush holder and commutator brushes assembled therein;

Fig. 11 is a view of Fig. 10 looking from the back side toward the front;

Fig. 12 is a section on the line 12—12 of Fig. 10;

Fig. 13 is a view of the brush holder per se looking down from the top of Fig. 11 without the brushes;

Fig. 14 is a sectional view on the line 14—14 of Fig. 1 but on a further enlarged scale;

Fig. 15 is a view on the line 15—15 of Fig. 1 but on the same scale as Fig. 14;

Fig. 16 is an enlarged sectional view through the brush holder just in front of one of the brushes;

Fig. 17 is a view on the line 17—17 of Fig. 16;

Fig. 18 is a view on the line 18—18 of Fig. 16;

Fig. 19 is a perspective view of one of the brush clamps used in the assembly of the brush holder;

Fig. 20 is an assembly view of the clamp shown in Fig. 19 with one of the brushes;

Fig. 21 is a sectional view illustrating one step in the molding or construction of the commutator;

Fig. 22 is a view approximately on the line 22—22 of Fig. 21; and

Fig. 23 is an end view of the commutator before the operation of separating the ring into the commutator bars.

Referring now to the details wherein like numbers refer to corresponding parts in the various views, 1 is a frame structure of molded material which may be of non-magnetic metal or suitable insulating material, since the device is very small and light. The frame has at one end 3 projecting lugs 2, 3 and 4 which are preferably joined by a rim 5. Lugs 2, 3 and 4 are tapped to receive mounting screws. If the frame is made of insulating material then lugs 2, 3 and 4 may, if necessary, be supplied with metallic inserts.

Completely housed within the frame 1 is a magnetic field unit composed of a permanent magnet block 6 having pole pieces 7 and 8 fastened thereto by studs 9 and 10, the latter of which passes through a recess 11 in the lower end of the magnet 6 while the stud 9 passes above the upper end of the magnet 6. By this construction the molded material will pass into the recess 11 and around the stud 10, as well as around the stud 9, and will securely anchor the field unit in position in the frame. It will be noted from Fig. 4 that the pole pieces 7 and 8 extend upwardly from the magnet 6 in an arcuately formed manner to a position for cooperation with an armature 12 having laminations 13 and winding 14 positioned within slots in the laminations in the usual manner. The armature is carried on a rotary shaft 15 which is supported in bearings 16 and 17. These bearings are preferably made of porous sintered metal so that they will absorb a lubricant, such as oil, that is supplied by washers 18 and 19 that are capable of carrying a reserve of oil.

I have found that these washers may be made of suitable felt. The bearing 16 has an outwardly projecting hub 20 and the bearing 17 an outwardly projecting hub 21. The washers 18 and 19 rest on these hubs and also are in engagement with the flat surfaces of the bearings 16 and 17 so as to transmit the oil to the oil-absorbent materials of the bearings 16 and 17. Hubs 20 and 21, while acting to support the washers 18 and 19, also provide extra length of bearings for the shaft 15, one end of which projects from the bearing 17 for attachment to some device to be driven. The bearing 17 rests against an annular shoulder 22 and is held in place together with its cooperating washer 19 by a disc 23 that is held in place by peening over the material of the frame at a plurality of points 24.

The disc 19 is provided with an oil hole 25 so that lubricant may be inserted into contact with the washer 19 which has a small portion cut out, as indicated by the line 26 (see Fig. 6) adjacent the hole 25 so as to receive a quantity of oil that can be absorbed by the washer 19. At the opposite end of the frame a disc 27 closes this end of the device by having the metal of the frame pinned over at 28 but in this case the disc 20 has a centrally located hole 29 for inserting lubricant to the washer 18.

The rotor carries a commutator C which is made up in a manner which I believe to be new and novel, as indicated by Figs. 21, 22 and 23 which show the manner of construction of the commutator. In these figures a die block D is utilized in which the ring 30 is placed. Ring 30 has projections 31 around which insulating material 32 is formed, a rod 33 being utilized in the die to make an opening to receive the shaft 15. As will be noted from Figs. 21 and 22, the insulating material forms interlocking dove-tailed joints with the ring 30. Hole 34 shown in Fig. 2 is the pouring hole in the die for pouring the insulating material thereinto. After the commutator is removed from the die an end view of the same is substantially as shown in Fig. 23. Then the ring 30 is slotted along its length, as shown in Fig. 7, to form the bars 35 of the commutator ready to receive the end conductors 36 of the armature winding 14.

In order to convey current to the commutator C of the motor, I have provided a brush holder and brushes, as will now be described.

A block of suitable insulating material 37 is fastened to the frame 1 as by a screw 38. The brush holder 37 along its inner face is provided with a pair of spaced slots 39 and 40 (see Figs. 12 and 14), which preferably widen out toward the top, as indicated by the number 41. This is to provide space for movement of the two flexible brushes 42 and 43. The lower end of each slot is provided with a projection 44 to receive the notch 45 in its contact spring, thereby positively locating the same in the brush holder 37. Each of the brushes 42 and 43 are preferably made of beryllium copper which are heat-treated so as to get a uniform contour and tension, and, as shown in Figs. 14 and 20, have their upper ends split at 46 and these split ends 47 are bent outwardly, as shown in Fig. 14 to define a more positive contact engaging surface with the bars of the commutator.

Since the brushes 42 and 43 are of thin material, I prefer to use for each of them a reinforcing clamp 48, as shown in Fig. 19, and assembled to its brush, as shown in Fig. 20. By using clamp 48 it will seem that the flexing point of the brushes will be at the upper end 49 of the clamp. It will be noted from Fig. 6 that the upper end of the brush holder 37 is recessed at 50 to provide an extension portion 51 that protrudes into an opening 52 (see Fig. 9) in the frame directly below the commutator, and the frame at this point has a lug 53 that is adapted to enter a recess 54 in the brush holder 37 to prevent any lateral or oscillatory motion of the brush holder on the frame. In mounting the brush holder 37 on the frame an insulator 58 is used to prevent the springs 42 and 43 from coming into contact with the frame when this is made of metal.

It will be noted from Figs. 16, 19 and 20 that the clamps 48 are provided with a cut-away portion 55 which are opposite notches 56 in the brushes 42 and 43 so as to provide means for holding contact conductors thereto. Preferably these ends of the springs and clamps are provided with a lump of solder 57 at the time the clamp is assembled to the springs so that in making connection thereto by a conductor only a small amount of heat need by supplied to the solder 57 for making the connection whereby the heat applied to the spring is relatively small and will not affect its tension qualities.

From what has been said it will be readily understood that this small motor has an extremely low horsepower at a load speed of 3000 R. P. M., and when operated from a small battery of the flashlight type, or even smaller, the current taken is only a fraction of an ampere. It will of course be understood that the winding can be changed to obtain different ranges of speed, torque and horsepower.

It may also be noted that the holes H, Figs. 1 and 8, in the frame, are merely holes in the frame casting left by positioning pins that locates the field structure of Fig. 4 in the die.

I claim:

1. An electric motor including a moulded frame housing carrying a magnetic field unit composed of a permanent magnet having upwardly extending pole pieces arcuately formed to operatively cooperate with a rotor structure, bearings capable of picking up lubricant positioned in opposite end of the frame, each bearing having outwardly extending centrally located hubs, washers capable of carrying a supply of lubricant and passing it to said bearings located around said hubs, circular discs for closing the bearing ends of the frame adjacent said washers, a rotor having a shaft extending between said bearings and outside the frame at one end, said shaft carrying an armature located between said arcuately formed pole pieces, a commutator for the armature carried by the shaft on the end opposite the extending end, and means for passing current to said commutator.

2. An electric motor including a magnetic field unit completely housed within a moulded frame, said unit composed of a block of permanent magnetic material having oppositely positioned pole pieces extending upwardly from said block and arcuately formed to direct magnetic flux through a rotor element, sintered metal bearings having outwardly extending hubs for receiving shaft ends, oil carrying washers positioned around said hubs in engagement with one side of said bearings, discs for closing the bearing ends of the frame adjacent said washers with means associated with the discs for passing oil to said washers, a rotor having a shaft extending between said bearings and outside the frame at one end, said shaft carrying an armature located between said arcuately formed pole pieces, a commutator for the armature carried by the shaft on the end opposite the extending end, and means for passing current from said commutator.

3. A miniature electric motor having a magnetic field unit composed of a permanent magnet having flux distributing pole pieces extending upwardly from the magnet and having its ends arcuately formed to cooperate with a rotor element, said field unit being cast within a unitary frame with means for anchoring said unit securely in the frame, a rotor shaft carrying an armature between said arcuately formed pole piece ends, plate type bearings of suitable sintered metal located against annular shoulders at opposite ends of the frame, oil absorbent washers located against said bearing plates, discs fastened to the ends of the frame for holding said washers and bearing plates in position, with means for passing oil to said washers, the shaft extending through one bearing, washer and disc for driving purposes, a commutator for the armature carried by the shaft, a brush holder carried on the outside of the frame below the location of the commutator, and brushes carried by the holder and extending within the frame in contact with opposite portions of the commutator.

4. A miniature electric motor having a magnetic field unit composed of a permanent magnet having flux distributing pole pieces extending upwardly from the magnet and having its ends arcuately formed to cooperate with a rotor element, said field unit being cast within a unitary frame with means for anchoring said unit securely in the frame, a rotor shaft carrying an armature between said arcuately formed pole piece ends, plate type bearings of suitable sintered metal located against annular shoulders at opposite ends of the frame, oil absorbent washers located against said bearing plates, discs fastened to the ends of the frame for holding said washers and bearing plates in position, with means for passing oil to said washers, the shaft extending through one bearing, washer and disc for driving purposes, a commutator for the armature carried by the shaft, a brush holder carried on the outside of the frame below the location of the commutator and having its upper end extending through an opening in the frame with means on the frame engaging cooperative means on the holder for positively locating the holder, thin brushes carried in edgewise position in the holder and extending into operating contact with the commutator, and means for holding the brushes securely in the holder, including insulating means between the outer free edges of the brushes and the frame.

5. A miniature electric motor as defined in claim 4, further characterized in that the means for securely holding the brushes in the holder includes clamping members for embracing much of the lower ends of the thin brushes, said clamping member having at least some resilience to make frictional engagement with the material of the holder, and further cooperative interlocking means between the holder, brushes and the clamps.

6. A miniature electric motor as defined in claim 1, further characterized in that a plurality of triangularly spaced mounting lugs extend from the frame below the extending end of the shaft, said studs being integral with the frame and interconnected by a reinforcing rim also integral with the frame.

7. An electric motor as set forth in claim 1, further characterized in that said means for passing current to the commutator comprises a brush holder of suitable insulating material, said holder being fastened to the exterior of the frame below the location of the commutator, the holder having a pair of spaced longitudinally extending slots widening out at the ends nearest the commutator, brushes located in said slots and having ends extending above the holder through an opening in the frame into engagement with opposite sides of the commutator.

8. An electric motor as set forth in claim 1, further characterized in that said means for passing current to the commutator comprises a brush holder of suitable insulating material, said holder being fastened to the exterior of the frame below the location of the commutator, the holder having a pair of spaced longitudinally extending slots widening out at the ends nearest the commutator, projections of the holder material located in the lower ends of said slots, a brush located in each slot and having a notch therein to engage its cooperative projection, the brushes having reinforcing clamps to assist in holding the brushes in said slots, the brushes having split ends extending above the holder and having their ends bent away from each other, the bend in each brush being located on a line near where the brush engages the commutator.

9. An electric motor including a moulded frame housing carrying a magnetic field unit composed of a permanent magnet having upwardly extending pole pieces arcuately formed to operatively cooperate with a rotor structure, bearings positioned in opposite ends of the frame, a rotor having a shaft extending between said bearings and outside the frame at one end, said shaft carrying an armature located between said arcuately formed pole pieces, a commutator for the armature carried by the shaft on the end opposite the extending end, and means for passing current to said commutator comprising a brush holder of suitable insulating material, said holder being fastened to the exterior of the frame below the location of the commutator, the holder having a pair of spaced longitudinally extending slots widening out at the ends nearest the commutator, brushes located in said slots and having ends extending above the holder through an opening in the frame into engagement with opposite sides of the commutator.

10. An electric motor including a moulded frame housing carrying a magnetic field unit composed of a permanent magnet having upwardly extending pole pieces arcuately formed to operatively cooperate with a rotor structure, bearings positioned in opposite ends of the frame, a rotor having a shaft extending between said bearings and outside the frame at one end, said shaft carrying an armature located between said arcuately formed pole pieces, a commutator for the armature carried by the shaft on the end opposite the extending end, and means for passing current to said commutator comprising a brush holder of suitable insulating material, said holder being fastened to the exterior of the frame below the location of the commutator, the holder having a pair of spaced longitudinally extending slots widening out at the ends nearest the commutator, projections of the holder material located in the lower ends of said slots, a brush located in each slot and having a notch therein to engage its cooperative projection and a channel-shaped reinforcing clamp fitted over one edge of the brush to assist in holding the brushes in said slots, the brushes having split ends extending above the holder and having their ends bent away from each other, the bend in each brush being located on a line near where the brush engages the commutator.

FRED R. SCHULZ.

No references cited.